INFRARED ABSORPTION SPECTRUM OF ASPERLIN

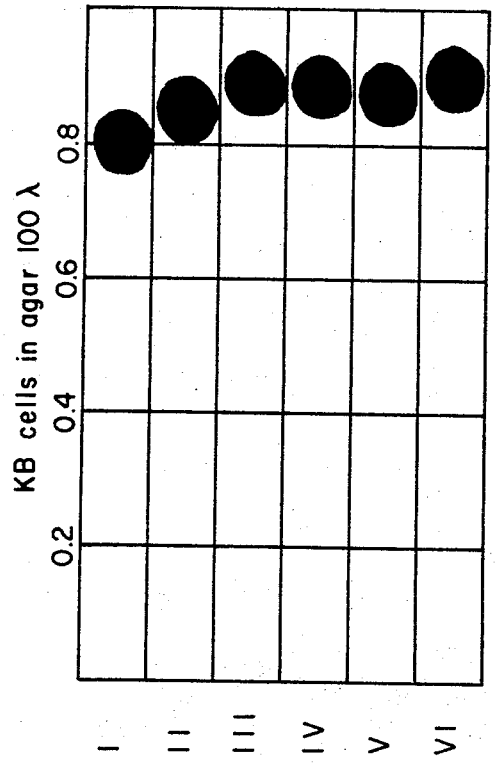

United States Patent Office 3,366,541
Patented Jan. 30, 1968

3,366,541
**ANTIBIOTIC ASPERLIN AND PROCESS FOR PRODUCING USING *ASPERGILLUS NIDULANS***
Alexander D. Argoudelis and John H. Coats, Kalamazoo, Mich., assignors to The Upjohn Company, Kalamazoo, Mich., a corporation of Delaware
Filed July 22, 1964, Ser. No. 384,431
6 Claims. (Cl. 167—65)

ABSTRACT OF THE DISCLOSURE

Antibiotic named asperlin which is produced by the fungus *Aspergillus nidulans*. Asperlin is active against gram-positive and gram-negative bacteria. It can be used as a disinfectant on various dental and medical equipment contaminated with the bacteria *Staphylococcus aureus*.

---

Figure 1:
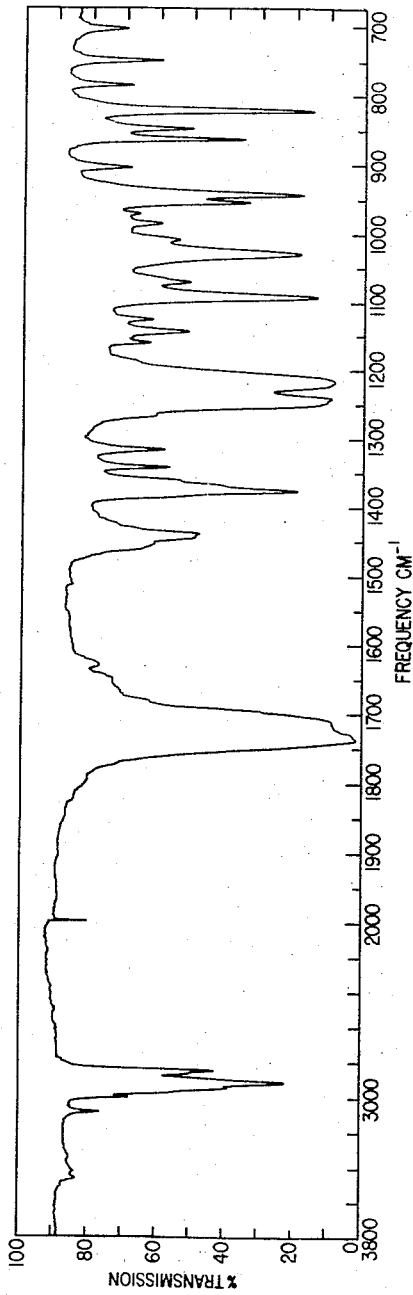

This invention relates to a novel composition of matter and to a process for the production thereof. More particularly, this invention relates to a new compound, asperlin (U–13,933), and to a process for the production thereof.

The new compound of this invention is an elaboration product of an asperlin-producing fungus. It has the property of adversely affecting growth of various organisms, particularly bacteria, and can be used alone or in combination with other antibacterial agents, to prevent the growth of or to reduce the number of microorganisms present in various environments, such as in mammals, birds, fish, reptiles, and plants, where the infecting microorganism is susceptible to asperlin. It can also be used as a feed supplement to promote the growth of animals, for example, mammals, birds, fish, and reptiles.

Asperlin is distinguished from known antibacterial agents or antibiotics by its characteristic IR spectrum, shown in FIGURE I; by its inhibitory activity against various gram-positive and gram-negative bacteria; by its molecular weight of 208 (determined by isothermal distillation in acetonitrile); by its optical rotation of $[\alpha]_D^{25}$ +345° (c., 0.9, 95% ethanol); by the following elemental analysis: C, 57.10; H, 6.03; O, 36.20, and by its solubility characteristics in various solvents as hereinafter shown.

*Aspergillus nidulans* is a known fungus originally obtained from the London School of Hygiene and Tropical Medicine as *Aspergillus nidulans* BB 46. It is on deposit at the Commonwealth Mycological Institute in England where its deposit number is CMI 94,163. It has been deposited with, and can be obtained from, The Fermentation Division, Northern Utilization Research Branch, U.S. Department of Agriculture, Peoria, Illinois, where its deposit number is NRRL 3134.

The new compound of the invention is produced when the elaborating organism is grown in an aqueous nutrient medium under submerged aerobic conditions. It is to be understood also that for the preparation of limited amounts, surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, lactose, dextrin, molasses, and the like. Preferred nitrogen sources include corn steep liquor, yeast, autolyzed Brewer's yeast with milk solids, soybean meal, cottonseed meal, corn meal, milk solids, pancreatic digest of casein, distiller's solubles, animal peptone liquors, meat and bone scraps, and the like. Combination of these carbon and nitrogen sources can be used advantageously. Trace metals, for example, zinc, magnesium, manganese, cobalt, iron, and the like need not be added to the fermentation media since tap water and unpurified ingredients are used as media components.

Production of the compound of the invention can be effected at any temperature conducive to satisfactory growth of the microorganism, for example, between about 18° and 40° C. and preferably between about 20° and 30° C. Ordinarily, optimum production of the compound is obtained in about 2 to 10 days. The medium normally stays fairly close to neutral, or on the alkaline side during the fermentation. The final pH is dependent, in part, on the buffers present, if any, and in part on the initial pH of the culture medium which is advantageously adjusted to about pH 5–6 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

A variety of procedures can be employed in the isolation and purification of asperlin, for example, solvent extraction, liquid-liquid distribution in a Craig apparatus, the use of adsorbents, and crystallization from solvents. Solvent extraction procedures are preferred for commercial production inasmuch as they are less time consuming and less expensive, and higher recovery yields are obtained thereby.

In a preferred process, asperlin is recovered from its culture medium by separation of the mycelia and undissolved solids by conventional means such as by filtration or centrifugation. The antibiotic is then removed from the filtered or centrifuged broth by extraction. For the extration of asperlin from the filtered broth, solvents hereinafter listed can be used. Ethyl acetate is the preferred extraction solvent. The extract obtained by ethyl acetate extraction can be evaporated to dryness to provide the crude antibiotic directly. Preferably, however, the organic solvent extracts are processed further to obtain more purified forms of the antibiotic. In a preferred procedure, asperlin is recovered from the organic extract by adsorption chromatography by employing such adsorbents as silicic acid, alumina, and Florisil (a synthetic silicate of the type described in U.S. Patent No. 2,393,625 and sold by the Floridin Company). The adsorbed antibiotics can be removed from the adsorbent in relatively pure form by elution with a suitable organic solvent, e.g., one of those hereinafter mentioned in which asperlin is soluble.

The new compound of the invention, asperlin, is soluble in water-immiscible polar organic solvents, for example, ethyl acetate, amyl acetate, butyl acetate, and like aliphatic esters; 1-butanol, 2-butanol-, and like aliphatic alcohols; methyl isobutyl ketone, and like alkanones; chloroform, methylene chloride and like halogenated hydrocarbons; water-miscible organic solvents, for example, methanol, ethanol, and like alcohols; and hydrocarbon solvents, for example, benzene and toluene; and is relatively insoluble in water.

The new compound of the invention, asperlin, inhibits the growth of various gram-positive and gram-negative bacteria. For example, it is active against *Staphylococcus aureus, Poteus vulgaris, Proteus morganii,* and *Sarcina*

*lutea.* Accordingly, asperlin can be used as a disinfectant on various dental and medical equipment contaminated with *Staphylococcus aureus*; it can also be used as a disinfectant on washed and stacked food utensils contaminated with this organism. Asperlin can also be used to wash and sterilize excised tumors from rats as described in U.S. Patent No. 3,095,418.

The following examples are illustrative of the process and products of the present invention, but are not to be construed as limiting. All percentages are by weight, and solvent mixture proportions are by volume unless otherwise noted.

*Example 1, fermentation.*—A soil stock of *Aspergillus nidulans*, NRRL 3134, was used to inoculate a series of 500-ml. Erlenmeyer flasks each containing 100 ml. of sterile, preseed medium consisting of the following ingredients:

|  | G./liter |
|---|---|
| Glucose monohydrate | 25 |
| Pharmamedia [1] | 25 |
| Tap water | Balance |

[1] Pharmamedia is an industrial grade of cottonseed flour produced by Traders Oil Mill Company, Fort Worth, Tex.

The flasks were grown for 2 days at 28° C. on a Gump rotary shaker operating at 260 r.p.m.

One shake flask (100 ml.) of the preseed inoculum, described above, was used to inoculate a 20-l. seed tank containing 13 liters of sterile seed tank medium. The seed tank medium was the same as described above for the preseed stage.

The seed tank was grown for 24 hrs. at a temperature of 28° C., with aeration at a rate of 10 standard liters/minute, and agitation at a rate of 200 r.p.m.

The seed tank, described above, was used to inoculate a 400 liter fermenter containing 250 liters of the following sterile medium:

|  | Ml./liter |
|---|---|
| Wilson's Peptone Liquor No. 159 [1] | 20 |
| Glucose monohydrate | 40 |
| Malt extract | 25 |
| Calcium carbonate | 8 |
| Lard oil | 10 |
| Tap water | Balance |

[1] Wilson's Peptone Liquor No. 159 is a preparation of hydrolyzed proteins of animal origin.

The fermenter tank medium presterilization pH was 6.0. The fermentation cycle was 4 days during which time the temperature was controlled at 25° C., filtered air was supplied at a rate of 250 standard liters/minute, and agitation was at the rate of 320 r.p.m. Sterile lard oil was added to control foaming. Preharvest *Proteus vulgaris* M.R. assay [1] was 4.0 biounits/ml.[2] asperlin (Average dry solids 60 mg./ml.)

THE EXTRACTION

The whole broth (236 kg.) from an asperlin fermentation was slurried with 3% of its weight of diatomaceous earth and filtered. The filtered beer (280 liters) was extracted 3 times with 60-liter portions of ethyl acetate. The ethyl acetate extracts (256 liters) were pooled, concentrated, polished by filtration, and then dried to an oil weighing 449 g. Twenty grams of this material was slurried with 100 ml. of ether and then mixed with 400 ml. of Skellysolve B (isomeric hexanes). A precipitation which formed was separated by filtration and discarded. The filtrate was concentrated in vacuo to an oily material (17.55 g.). This material was used as the starting material for a Florisil column. The column was prepared by pouring 300 g. of Florisil into a glass column (2 inches inside diameter) filled with Skellysolve B. The adsorbent was allowed to settle under atmospheric pressure. Sea sand was added at the top of the adsorbent bed. (Holdup volume of the column was found to be 500 ml.) The 17.55 g. of starting material, described above, was dissolved in a minimum amount of methylene chloride and added to the top of the column. The column was then eluted and solids determined to give the results following:

| Fraction No. | Eluting Solvent | Volume ml. | Solids (mg./ml.) |
|---|---|---|---|
| 1 | Skellysolve B | 500 | 0.1 |
| 2 | do | 500 |  |
| 3 | Skellysolve B-acetone (90:10) | 500 | 0 |
| 4 | do | 500 |  |
| 5 | Skellysolve B-acetone (80:20) | 500 | 3.67 |
| 6 | do | 500 |  |
| 7 | Skellysolve B-acetone (70:30) | 500 | 2.15 |
| 8 | do | 500 |  |
| 9 | Skellysolve B-acetone (60:40) | 500 | 1.07 |
| 10 | do | 500 |  |
| 11 | Skellysolve B-acetone (50:50) | 500 | 0.31 |
| 12 | do | 500 |  |
| 13 | Skellysolve B-acetone (40:60) | 500 | 0.12 |
| 14 | do | 500 |  |
| 15 | Skellysolve B-acetone (30:70) | 500 | 0.42 |
| 16 | do | 500 |  |
| 17 | Skellysolve B-acetone (20:80) | 500 | 0.33 |
| 18 | do | 500 |  |
| 19 | Skellysolve B-acetone (10:90) | 500 | 0.16 |
| 20 | do | 500 |  |
| 21 | Acetone | 500 | 0.16 |
| 22 | do | 500 |  |
| 23 | Acetone-Methanol (50:50) | 500 | 1.55 |
| 24 | do | 500 |  |
| 25 | Methanol | 500 | 2.87 |
| 26 | do | 500 | 2.77 |

Fractions 5, 6. and 7 were combined and the solution (1,500 ml.) was concentrated to an oil weighing 4.03 g. and assaying 4.0 biounits/mg. of asperlin against *Proteus vulgaris*. This preparation was rechromatographed over a Florisil column. The column was prepared from 80 g. of Florisil in the same manner as described above; the holdup volume was found to be 130 ml. The starting material (4.03 g.) was dissolved in methylene chloride and added on top of the adsorbent bed. The column was then eluted and solids determinations were as follows: (Each fraction was 20 ml.)

A. *Skellysolve B*

| Fraction No.: | Solids (mg. in 2 ml.) |
|---|---|
| 1 | — |
| 2 | — |
| 3 | 0 |
| 4 | — |
| 5 | — |
| 6 | 22.17 |
| 7 | — |
| 8 | — |
| 9 | 0.18 |
| 10 | — |
| 11 | — |
| 12 | 0.18 |
| 13 | — |
| 14 | — |
| 15 | 0 |
| 16 | — |
| 17 | — |
| 18 | 0 |
| 19 | — |
| 20 | — |
| 21 | 0 |

[1] *Proteus vulgaris* M.R. assay refers to an agar plate assay where the test organism is a mixture of two resistant strains of *Proteus vulgaris*. One strain has been made resistant to the antibiotic xanthomycin whereas the other strain has been made resistant to the antibiotic streptothricin. These two resistant strains of *P. vulgaris* are then mixed in equal amounts and used as the test organism.
[2] A biounit is that amount of antibiotic when dissolved in 0.8 ml. of the test solution and applied to a 12.7 mm. disk gives a 20 mm. zone of inhibition under standard microbiological conditions.

B. *Skellysolve B-acetone (95:5)*

| Fraction No.: | Solids (mg. in 2 ml.) |
|---|---|
| 1 | — |
| 2 | — |
| 3 | 0 |
| 4 | — |
| 5 | — |
| 6 | 0 |
| 7 | — |
| 8 | — |
| 9 | 0.5 |
| 10 | — |
| 11 | — |
| 12 | 0.61 |
| 13 | — |
| 14 | — |
| 15 | 0.85 |
| 16 | — |
| 17 | — |
| 18 | 0.89 |
| 19 | — |
| 20 | — |
| 21 | 1.13 |

C. *Skellysolve B-acetone (90:10)*

| Fraction No.: | Solids (mg. in 2 ml.) |
|---|---|
| 1 | — |
| 2 | — |
| 3 | 1.33 |
| 4 | — |
| 5 | — |
| 6 | 0 |
| 7 | — |
| 8 | — |
| 9 | 5.85 |
| 10 | — |
| 11 | — |
| 12 | 6.64 |
| 13 | — |
| 14 | — |
| 15 | 6.56 |
| 16 | — |
| 17 | — |
| 18 | 5.18 |
| 19 | — |
| 20 | 2.96 |

D. *Skellysolve B-acetone (85:15)*

| Fraction No.: | Solids (mg. in 2 ml.) |
|---|---|
| 1 | — |
| 2 | — |
| 3 | 1.24 |
| 4 | — |
| 5 | — |
| 6 | 0.45 |
| 7 | — |
| 8 | — |
| 9 | 1.08 |
| 10 | — |
| 11 | — |
| 12 | 0.45 |
| 13 | — |
| 14 | — |
| 15 | 0.36 |
| 16 | — |
| 17 | — |
| 18 | 0.17 |
| 19 | — |
| 20 | — |
| 21 | 0 |

E. *Skellysolve B-acetone (80:20)*

| Fraction No.: | Solids (mg. in 2 ml.) |
|---|---|
| 1 | — |
| 2 | — |
| 3 | 0 |
| 4 | — |
| 5 | — |
| 6 | 0.60 |
| 7 | — |
| 8 | — |
| 9 | 0 |
| 10 | — |
| 11 | — |
| 12 | 0 |
| 13 | — |
| 14 | — |
| 15 | 0 |
| 16 | — |
| 17 | — |
| 18 | 0 |
| 19 | — |
| 20 | 0 |

F. *Skellysolve B-acetone (75:25)*

| Fraction No.: | Solids (mg. in 2 ml.) |
|---|---|
| 1 | — |
| 2 | — |
| 3 | 0 |
| 4 | — |
| 5 | — |
| 6 | 0 |
| 7 | — |
| 8 | — |
| 9 | 0 |
| 10 | — |
| 11 | — |
| 12 | 0 |
| 13 | — |
| 14 | — |
| 15 | 0 |
| 16 | — |
| 17 | — |

G. *Skellysolve B-acetone (70:30)*

| Fraction No.: | Solids (mg. in 2 ml.) |
|---|---|
| 1 | — |
| 2 | — |
| 3 | 0 |
| 4 | — |
| 5 | — |
| 6 | 0 |
| 7 | — |
| 8 | — |
| 9 | 0 |
| 10 | — |
| 11 | — |
| 12 | 0 |
| 13 | — |
| 14 | — |
| 15 | 0 |
| 16 | — |
| 17 | — |
| 18 | 0 |
| 19 | — |
| 20 | — |
| 21 | 0 |

The following pools were made:

Pool I: Fractions 5, 6, 7, and 8 obtained by elution with Skellysolve B.

Pool II: Fractions 12 to 21 eluted with Skellysolve B-acetone, 95:5, and fractions 1 to 8 eluted with Skellysolve B-acetone, 90:10.

Pool III: Fractions 9 to 20 eluted with Skellysolve B- acetone, 90:10, and fractions 1 to 9 eluted with Skellysolve B-acetone, 85:15.

Pools I, II, and III were concentrated in vacuo. The concentrated preparation from Pool III, which had the appearance of an oily material when it was isolated by concentration to dryness, crystallized on standing at room temperature for 1 hour. The crystals were leached with Skellysolve B and isolated by filtration and dried; yield 830 mg. of asperlin. The preparations obtained from the concentration of Pools I and II also crystallized to give 250 mg. of asperlin from each preparation; total of 500 mg. asperlin. The infrared spectra of the three crystalline asperlin preparations were identical. The crystalline preparations from Pools I and III were combined and recrystallized from Skellysolve B-acetone to give a preparation of asperlin weighin 650 mg. An additional 100 mg. of asperlin crystals was obtained from the mother liquors.

CHARACTERIZATION OF ASPERLIN

*U.V. absorption spectrum.*—Asperlin does not show any absorption maxima in the range 220–400 m$\mu$.

*Titration.*—Asperlin is a neutral compound.

*Solubility.*—Asperlin is soluble in water-immiscible polar organic solvents, for example, ethyl acetate, amyl acetate, butyl acetate, and like aliphatic esters; 1-butanol, 2-butanol, and like aliphatic alcohols; methyl ethyl ketone, methyl iso-butyl ketone, and like alkanones; chloroform, methylene chloride and like halogenated hydrocarbons; water-miscible organic solvents. for example, methanol, ethanol, and like alcohols; and hydrocarbon solvents, for example, benzene and toluene; and is relatively insoluble in water.

*Molecular weight.*—208 (by isothermal distillation in acetonitrile).

*Papergram.*—The paper chromatographic pattern of asperlin in the following solvent systems is as shown in FIG. 2 of the drawing:

I—1-butanol, water (84:16), 16 hours
II—1-butanol, water (84:16), plus 0.25% p-toluene sulfonic acid, 16 hrs.
III—1-butanol, acetic acid, water (2:1:1), 16 hrs.
IV—2% piperidine (v/v) in n butanol, water (84:16), 16 hrs.
V—1-butanol, water (4:96), 5 hrs.
VI—1-butanol, water (4:96) plus 0.25% p-toluene sulfonic acid, 5 hrs.

The papergram was bioautographed by use of KB cells in agar. KB cells are human epidermoid carcinoma cells.

*Specific rotation.*—$[\alpha]_D^{25} = +345$ (c. 0.9, 95% ethanol).

*Crystal appearance.*—Colorless crystals.

*Elemental Analysis.*—Calculated for $C_{10}H_{12}O_5$: C, 56.65; H, 5.66; O, 37.69. Found: C, 57.10; H, 6.03; O, 36.20.

*Infrared absorption spectrum.*—The infrared absorption spectrum of asperlin in mineral oil mull, as shown in FIG. I of the drawing, in reciprocal centimeters is as follows:

| | | |
|---|---|---|
| 3460 (W) | 1375 (M) (oil) | 1015 (M) |
| 3420 (W) | 1365 (M) | 992 (M) |
| 3080 (W) | 1347 (M) | 978 (M) |
| 2998 (W) | 1321 (M) | 962 (S) |
| 2950 (M) | 1272 (M) | 950 (S) |
| 2920 (S) (oil) | 1252 (S) | 912 (W) |
| 2850 (M) (oil) | 1245 (S) | 872 (S) |
| 1735 (S) | 1224 (S) | 856 (M) |
| 1715 (S) | 1166 (M) | 830 (S) |
| 1652 (W) | 1150 (M) | 792 (W) |
| 1632 (W) | 1132 (M) | 757 (W) |
| 1458 (M) (oil) | 1097 (S) | 712 (W) |
| 1443 (M) | 1076 (M) | |
| 1382 (S) | 1060 (S) | |

Band intensities in the above IR spectrum are indicated as S, M and W, respectively, and are approximated in terms of the backgrounds in the vicinity of the bands. An S band is of the same order of intensity as the strongest band in the spectrum; M bands are between 1/3 and 2/3 as intense as the strongest band, and W bands are less than 1/3 as intense as the strongest band.

We claim:
1. An antibiotic assaying at least 4.0 biounits/ml. of asperlin, a compound which:
   (a) is effective in inhibiting the growth of gram-positive and gram-negative bacteria; and in its essentially pure crystalline form;
   (b) is soluble in ethyl acetate, amyl acetate, butyl acetate, and like aliphatic esters; 1-butanol, 2-butanol, and like aliphatic alcohols; methyl ethyl ketone, methyl isobutyl ketone, and like alkanones; chloroform, ethylene chloride, and like halogenated hydrocarbons; methanol, ethanol, and like alcohols; and benzene and toluene; and is relatively insoluble in water;
   (c) has the following empirical formula and elemental analysis: $C_{10}H_{12}O_5$: C, 57.10; H, 6.03; O, 36.20;
   (d) has a molecular weight of 208 as determined by isothermal distillation in acetonitrile;
   (e) has an optical rotation of $[\alpha]_D^{25} + 345°$ (c., 0.9, 95% ethanol); and
   (f) has a characteristic infrared absorption spectrum as shown in FIGURE I of the accompanying drawing.

2. A compound as defined in claim 1, asperlin, in its essentially pure form.

3. A compound as defined in claim 1, asperlin, in its essentially pure crystalline form.

4. A process which comprises cultivating *Aspergillus nidulans* NRRL 3134 in an aqueous nutrient medium under aerobic conditions until substantial asperlin is produced.

5. A process which comprises cultivating *Aspergillus nidulans* NRRL 3134 in an aqueous nutrient medium containing a source of assimilable carbohydrate and assimilable nitrogen under aerobic conditions until substantial asperlin is produced and isolating the asperlin so produced.

6. A process according to claim 5 in which the isolation comprises filtering the medium and then contacting the filtrate with a water-immiscible solvent for asperlin and recovering asperlin from the solvent extract.

References Cited

UNITED STATES PATENTS 3,104,204  9/1963  Olson _____ 167—65
3,104,208  9/1963  Olson et al. _____ 195—80

ALBERT T. MYERS, *Primary Examiner.*

D. M. STEPHENS, *Assistant Examiner.*